United States Patent
Hanney et al.

(10) Patent No.: US 8,469,534 B2
(45) Date of Patent: Jun. 25, 2013

(54) PDT MAGNIFIER CAMERA ILLUMINATION

(75) Inventors: Mike Hanney, St. Petersburg, FL (US); Peter Iezzi, St. Petersburg, FL (US); Todd Conard, St. Petersburg, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 0 days.

(21) Appl. No.: 13/041,734

(22) Filed: Mar. 7, 2011

(65) Prior Publication Data

US 2011/0157915 A1 Jun. 30, 2011

Related U.S. Application Data

(63) Continuation of application No. 11/689,019, filed on Mar. 21, 2007, now Pat. No. 7,905,648.

(60) Provisional application No. 60/767,353, filed on Mar. 21, 2006.

(51) Int. Cl.
*G09F 13/08* (2006.01)

(52) U.S. Cl.
USPC .......... 362/97.3; 362/97.1; 362/97.4; 362/98; 362/455; 362/555; 362/561; 362/612; 362/628; 349/64; 349/200; 396/155; 396/182; 396/267; 396/419; 396/428; 396/429; 348/373; 345/4; 345/589

(58) Field of Classification Search
USPC ................ 362/97.1, 97.3, 97.4, 98, 455, 555, 362/561, 612, 628; 349/64, 200; 345/4, 589; 396/155, 182, 267, 419, 428, 429; 348/373
See application file for complete search history.

(56) References Cited

U.S. PATENT DOCUMENTS

| | | | |
|---|---|---|---|
| 5,499,052 | A | 3/1996 | Nakanishi et al. |
| 5,822,036 | A | 10/1998 | Massie et al. |
| 2004/0004826 | A1 | 1/2004 | Wakaki et al. |
| 2005/0062847 | A1 | 3/2005 | Johnston |
| 2005/0134692 | A1 | 6/2005 | Izumi |
| 2005/0212721 | A1 | 9/2005 | Kuwahara et al. |
| 2006/0268569 | A1 | 11/2006 | Rodriguez et al. |
| 2007/0109529 | A1 | 5/2007 | Wagner et al. |

FOREIGN PATENT DOCUMENTS

| | | |
|---|---|---|
| JP | 2003295307 | 10/2003 |
| WO | 00/39744 | 7/2000 |

*Primary Examiner* — Mary McManmon
(74) *Attorney, Agent, or Firm* — GrayRobinson, P.A.; Michael J. Colitz, III (57) ABSTRACT

A device that enlarges text and images to enable a low vision person to see the text and images includes a hollow structure including a top housing and a bottom housing that are connected to one another. A camera aperture is formed in the bottom housing and a transparent light guide lens is disposed in closing relation to the camera aperture so that all light entering the camera aperture must first pass through the light guide lens. A cavity formed in the light guide lens is bounded by walls that are positioned at a critical angle. Light-emitting diodes are positioned at critical locations about the periphery of the light guide lens to illuminate the object being viewed.

13 Claims, 5 Drawing Sheets

PDT MAGNIFIER CAMERA ILLUMINATION

CROSS-REFERENCE TO RELATED DISCLOSURES

This application is a continuation of and claims priority to co-pending Utility Patent Application, Serial No. 11/689,019, filed Mar. 21, 2007, entitled "PDT Camera Magnifier Illumination," which in turn claims priority to U.S. Provisional Application Serial Number 60/767,353 filed on Mar. 21, 2006. The disclosures of both these applications are fully incorporated herein by reference.

BACKGROUND OF THE INVENTION

1. Field of the Invention

This invention relates, generally, to devices that enable people having low vision to read printed documents. More particularly, it relates to a camera in an electronic magnifier requiring symmetrical illumination when used in contact with or near a target object such as a printed document.

2. Description of the Prior Art

Using a magnifying glass to enlarge print is problematic. The glass must be positioned a specific distance from the paper to obtain optimal magnification, and the paper must be well-illuminated.

The art has therefore moved in the direction of using video cameras to view the print and to drive a liquid crystal display (LCD) that displays the camera output in enlarged form. Such systems typically include a magnifier system where magnification is determined by the distance to the object to be viewed, the ratio of sensor to display size, and optical features of the camera. In the future, the optical features of the camera may perform the magnification.

Uniform, symmetrical illumination of the object being viewed has remained problematic. Thus, there remains a need for a low vision reader having an LCD display of a well-illuminated object.

Conventional low vision readers require a user to either hold the reader above the document or to use clumsy stands to hold the reader above the document.

Thus there is a need for a low vision reader that does not require a user to hold the reader in hovering relation to a document, either with or without a stand.

However, in view of the prior art taken as a whole at the time the present invention was made, it was not obvious to those of ordinary skill how the identified needs could be fulfilled.

SUMMARY OF THE INVENTION

The long-standing but heretofore unfulfilled need for a low vision reader including an LCD display of a well-illuminated object is now met by a new, useful, and non-obvious invention. The invention also fulfills the need for a device that need not be held over a document in hovering relation thereto when in use.

The novel device enlarges text and images to help a low vision person see such text and images. A hollow structure includes a top housing and a bottom housing that are connected to one another. A camera aperture is formed in the bottom housing and a transparent optical light guide lens is disposed in closing relation to the camera aperture so that all light entering the camera aperture must first pass through the optical light guide lens.

Significantly, the device rests atop the document or other object being viewed. Accordingly, no stands or other means for hovering the reader over the document are required. The reader is easily slideable from one part of the document to the next, and the part of the document being viewed is always well-illuminated with symmetrical lighting so that there are no dark spots or other abnormalities in the LCD output display.

A first undercut is formed in the bottom housing adjacent a first edge of the camera aperture and a second undercut is formed in the bottom housing adjacent a second end of the camera aperture. The optical light guide lens has a first mounting flange at a first end thereof, a second mounting flange at a second end thereof, and a raised section between the first and second mounting flanges. The first undercut is defined by a first overhang and is adapted to receive the first mounting flange. The second undercut is defined by a second overhang and is adapted to receive the second mounting flange.

The first mounting flange has a length in excess of a depth of the first undercut so that a first space is created between the raised section of the light guide lens and the first overhang. The second mounting flange also has a length in excess of a depth of the second undercut so that a second space is created between the raised section of the light guide lens and the second overhang.

A printed circuit board is disposed in overlying relation to an interior side of the optical light guide lens. A window or opening is formed in the printed circuit board so that light can pass through the light guide lens. A first pair of light-emitting diodes is secured to a first end of the printed circuit board adjacent a first end of the camera aperture and a second pair of light-emitting diodes is secured to a second end of the printed circuit board adjacent a second end of the camera aperture. The first pair of light-emitting diodes is disposed in the first space on opposite sides of a longitudinal axis of symmetry of the camera aperture and the second pair of light-emitting diodes is disposed in the second space on opposite sides of the longitudinal axis of symmetry of the camera aperture.

An important advantage of the invention is that the object being viewed is illuminated in an optimal way by the light emitting diodes (LEDs) that are strategically positioned about the perimeter of the optical light guide lens. The optical light guide lens has a specific structure that bends light rays emitted by the LEDs into the object being scanned without any reflections of the LEDs on the camera.

Another major advantage is that the novel structure minimizes light leakage about the periphery of the optical light guide lens.

These and other advantages will become apparent as this disclosure proceeds. The invention includes the features of construction, arrangement of parts, and combination of elements set forth herein, and the scope of the invention is set forth in the claims appended hereto.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

U.S. patent application Ser. No. 11/308,298, entitled "Magnifier Having Slideably Mounted Camera," filed by the same inventors on Mar. 15, 2006, which application claims priority to U.S. provisional patent application No. 60/595,003, entitled: "Portable Electronic Magnifier," filed by the same inventors on May 26, 2005, is hereby incorporated by reference into this disclosure.

Figure 1:
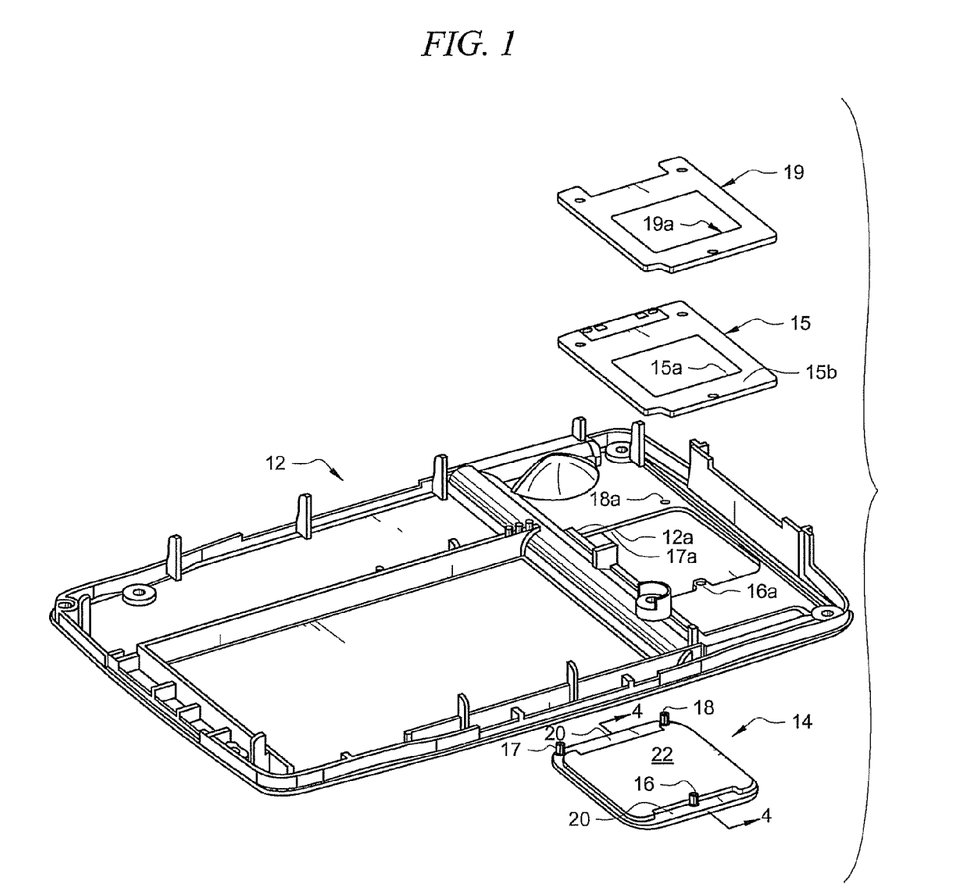
FIG. 1 is an exploded perspective view of a bottom housing.

FIG. 1 of the present disclosure depicts bottom housing 12 that is engaged at its periphery by sidewalls 14a, 14b, 14c, and 14d of top housing 10 depicted in FIGS. 2, 3 and 4 of the incorporated disclosure. Generally rectangular opening 12a is formed in said bottom housing 12 at a first end thereof so that when bottom housing 12 is attached to top housing 10 of the incorporated structure, opening 12a is in registration with mirror 26 of the structure depicted in the incorporated disclosure. Thus, rectangular opening 12a is understood to be a camera aperture. The user of the device slides opening 12a over the text or other image to be enlarged and the enlarged text or image appears on LCD screen 14, depicted in FIG. 2 of the incorporated disclosure.

Light guide lens 14 of this disclosure is positioned in registration with camera aperture 12a when the novel device is fully assembled. Light guide lens 14 is made of a clear plastic, preferably Plexiglas® acrylic resin.

Upstanding pegs 16, 17, and 18 are formed integrally with light guide lens 14 and are adapted to engage openings denoted 16a, 17a, and 18a, respectively, fowled in bottom housing 12 about the periphery of aperture 12a. More particularly, prior to attaching bottom housing 12 to top housing 10 of the incorporated disclosure, printed circuit board (PCB) 15, as depicted in FIG. 1, is placed in closing relation to camera aperture 12a on the interior side thereof. Opaque stiffener 19 is then placed in overlying relation to said PCB, and novel light guide lens 14 is positioned in underlying relation to said PCB by inserting pegs 16, 17, and 18 into peg bores 16a, 17a, and 18a, respectively. The interior side of light guide lens 14 is depicted in FIG. 1 and said PCB overlies said interior side.

Opening or window 15a is formed in the center of PCB 15 and opening or window 19a is formed in the center of stiffener 19 so that light rays can enter light guide lens 14. Exterior surface 15b of PCB 15 is preferably black in color to provide a mask around camera aperture 12a and to reduce stray light effects that may propagate towards the camera.

Figure 3:
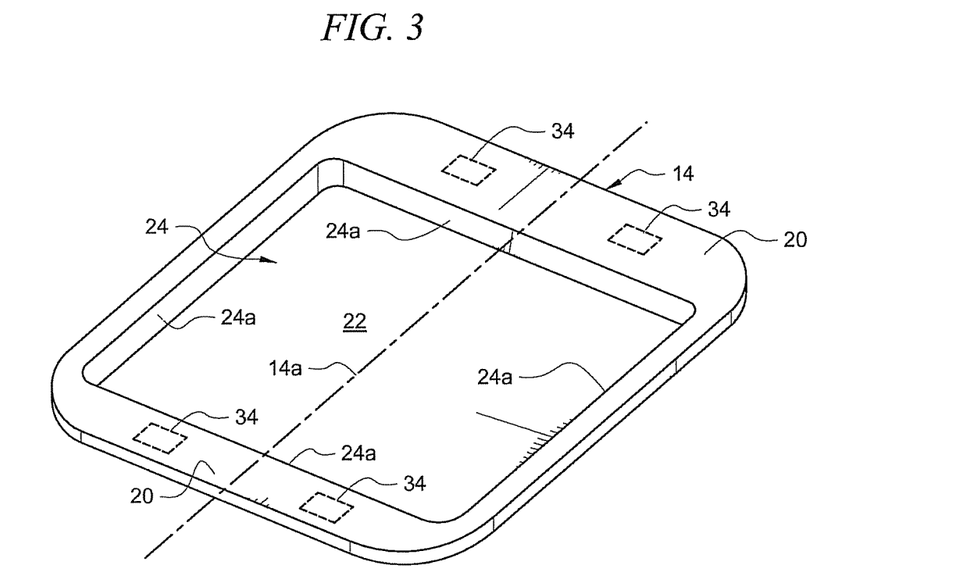
FIG. 3 is a perspective view of the exterior side of the novel light guide lens.
Figure 4:
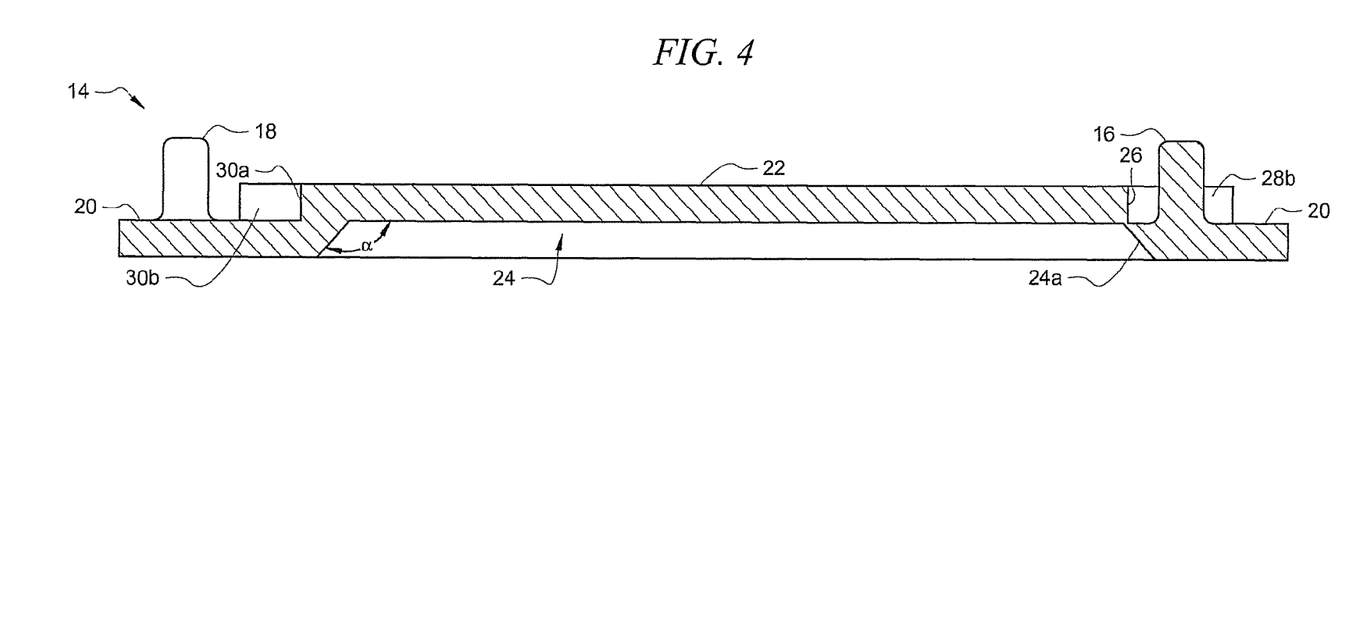
FIG. 4 is a cross-sectional view taken along line 4-4 in FIG. 1 and along line 4-4 in FIG. 2.
Figure 5:
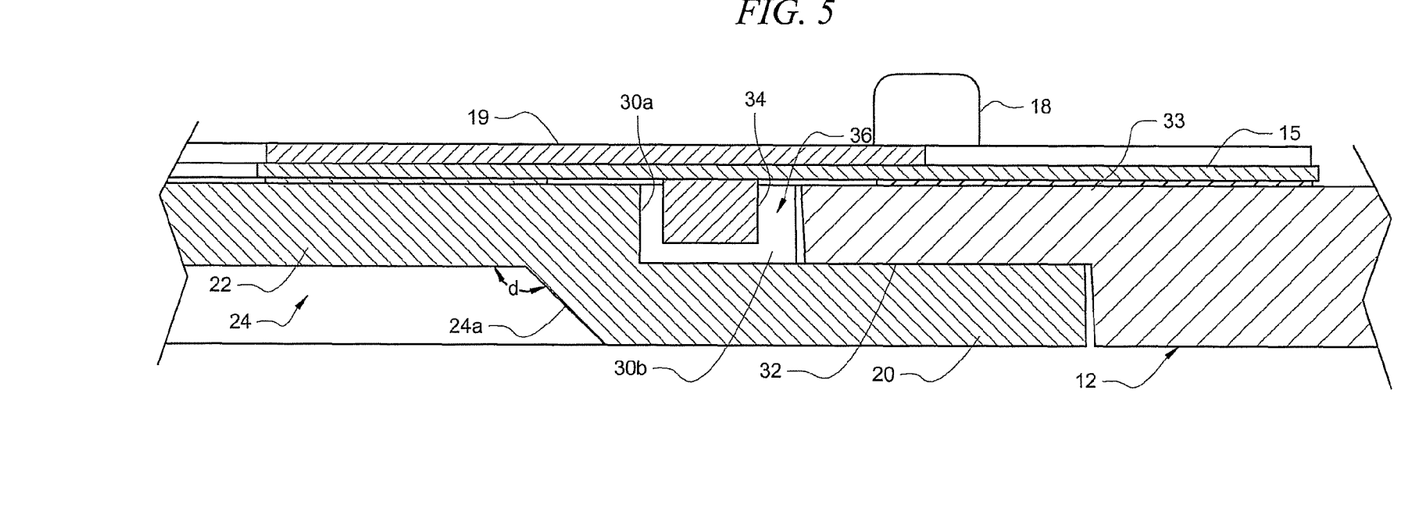
FIG. 5 is a cross-sectional view depicting the light guide lens and the bottom housing when connected to one another, including an LED, the PCB, and the stiffener.

Light guide lens 14 includes a flange 20 at its opposite ends. Center part 22 of light guide lens 14 is raised with respect to said flanges, thereby creating cavity 24 (FIG. 3-5). Angle α is one hundred thirty five degrees (135°).

Figure 2:
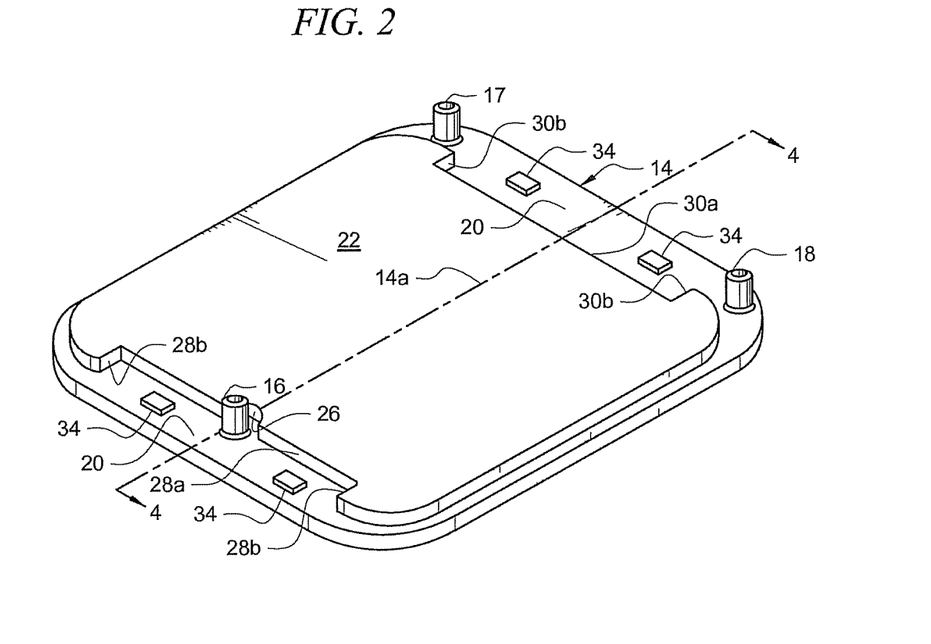
FIG. 2 is a perspective view of the interior side of the novel light guide lens.

As best depicted in FIG. 2, peg 16 is positioned within arcuate recess 26 formed in a transverse edge 28a of raised part 22. Edge 28a is bounded by longitudinally-extending edges 28b, 28b. Second transverse edge 30a, on the opposite side of raised section 22, is bounded by longitudinal edges 30b, 30b. FIG. 2 also indicates the positions of four (4) light emitting diodes (LEDs), collectively denoted 34.

Significantly, a first pair of said LEDs are positioned at a first end of light guide lens 14 on opposite sides of longitudinal axis of symmetry 14a of said light guide lens in symmetrical relation to one another, and a second pair of said LEDs are positioned at a second end of light guide lens 14 on opposite sides of said longitudinal axis of symmetry in symmetrical relation to one another.

Although PCB 15 is not depicted in FIG. 2, it should be understood that LEDs 34 are secured to said PCB. The height difference between mounting flanges 20, 20 and raised section 22 is sufficient to accommodate said LEDs.

FIG. 3 depicts the exterior side of light guide lens 14. Each wall 24a is angled relative to the plane of raised section 22 at an angle α that is equal to one hundred thirty five degrees (135°) as aforesaid.

FIG. 4 provides a cross-sectional view of optical light guide lens 14. All of the parts indicated by reference numerals in said FIG. 4 have been identified above.

FIG. 5 depicts bottom housing 12 having undercut 32 formed therein, defined by overhang 33. Each flange 20 of light guide lens 14 has an extent that exceeds the depth of its associated undercut 32 so that space 36 is created between raised center part 22 and overhang 33. There is a space 36 on each end of aperture 12a and each of said spaces accommodates two (2) LEDs.

Figure 6A:
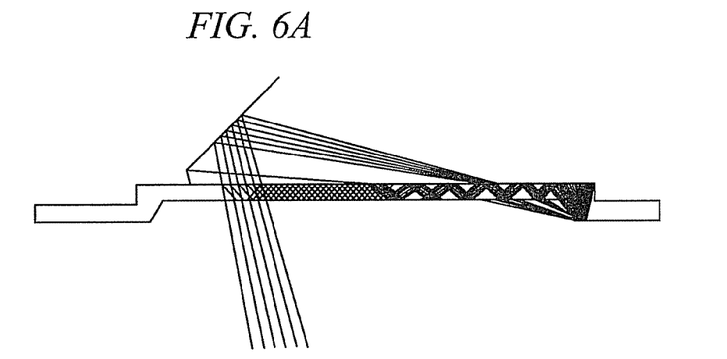
FIG. 6A is a simple ray trace diagram indicating how light rays are affected by the mirror of the incorporated disclosure.
Figure 6B:
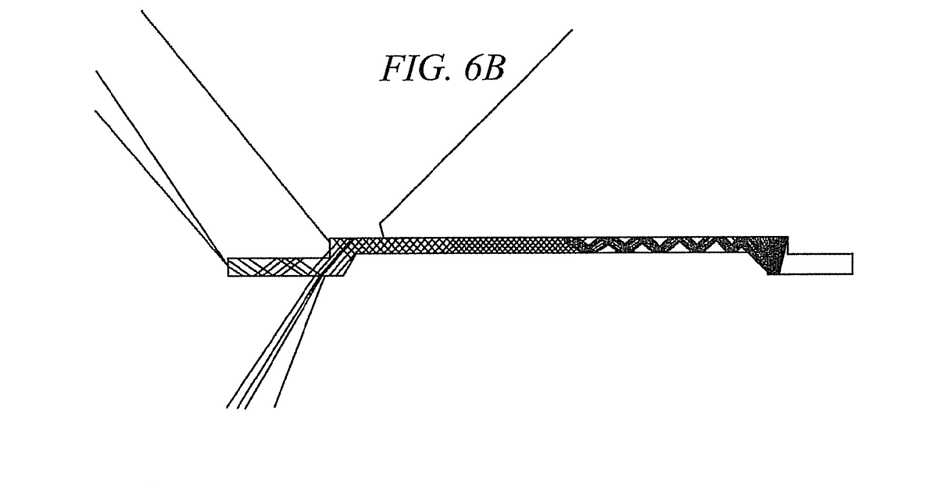
FIG. 6B is a raytrace diagram indicating the effectiveness of the angle α.
Figure 6C:
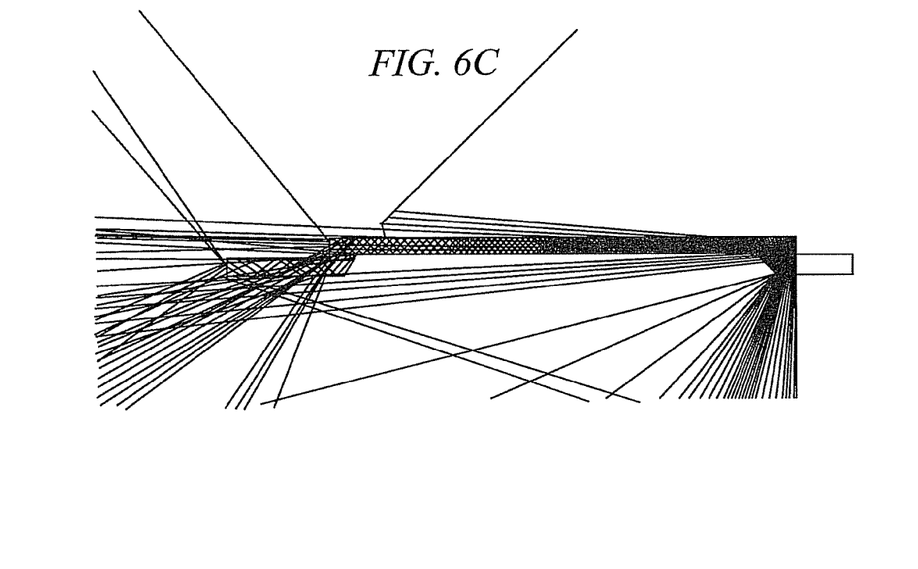
FIG. 6C is a raytrace diagram indicating how the novel positioning of LEDs relative to the novel structure of the optical light guide lens accomplishes the even illumination of the object being viewed.

Light rays entering the center of light guide lens 14 travel straight through raised section 22 but the light rays that encounter angled walls 24a are reflected therefrom in a way perhaps best explained by FIGS. 6A, 6B, and 6C.

More particularly, FIG. 6A depicts a simple raytrace modeling the scattered light from the land in front of the LEDs. This shows the path of the light up onto the mirror, where it is projected downwardly into the field of view.

By increasing the bevel angle to forty five degrees (45°), as depicted in FIG. 6B, the scattered light from this area is kept inside the window to contribute to the general illumination.

FIG. 6C depicts a simple model of the LED position. It shows that only a small pencil of light will strike the mirror at a low angle, outside of the field of view of the camera and any reflected light will be directed onto the back of PCB 15.

The relative positioning of each LED 34 relative to cavity 24, bounded by sidewalls 24a that are disposed at said angle α, is an important part of this invention. Each LED 34 is positioned in a space created by the step between raised section 22 and mounting flange 20 of optical light guide lens 14, said space being further created by the structuring of each mounting flange to exceed the depth of its associated undercut 32 as explained above. As best understood in connection with FIG. 5, this positions each LED 34 at a substantially forty five degree (45°) angle relative to its associated sidewall 24a. Each LED is thus positioned outside of cavity 24 and the light from each LED must pass through optical light guide lens 14 to illuminate the object being sensed by the camera of the incorporated disclosure. This novel structure eliminates the poor illumination characteristics of prior art devices.

The slideability of the novel structure over the document or other object being viewed is another important feature of the invention. The contact between the device and the object eliminates the need for stands or manual holding of the device in hovering relation to the object. The flat, low friction bottom of the device is understood from all of the figures but is perhaps best understood in connection with FIGS. 4 and 5.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

Now that the invention has been described,

What is claimed is:

1. A device that enlarges text and images of an object being viewed to enable a low vision person to see said text and images, comprising:
   a hollow structure including a top housing and a bottom housing that are connected to one another;
   a camera aperture formed in said bottom housing, a series of alignment openings formed about said camera aperture;
   a transparent light guide lens disposed in closing relation to said camera aperture, the light guide lens including a series of upstanding pegs that are positioned with said alignment openings of said camera aperture, said transparent light guide lens having first and second ends and a longitudinal axis of symmetry;
   a cavity formed within the light guide lens;
   a PCB with a window formed between opposing ends, said PCB disposed in overlying relation to said light guide lens, a series of alignment openings positioned about said window, whereby said upstanding pegs of said light guide lens are positioned with said alignment openings of said PCB to ensure the window is aligned with said light guide lens, at least one surface of the PCB being black to reduce stray light effects;
   said light guide lens having a first mounting flange at a first end thereof, a second mounting flange at a second end thereof, and a raised section between said first and second mounting flanges;
   said cavity defined at its periphery by a plurality of sidewalls that are inclined relative to said raised section to reflect light at an optimal angle, whereby said text and images are well-illuminated;
   a first pair of light-emitting diodes positioned at said first end of said light guide lens on opposite sides of said longitudinal axis of symmetry, a second pair of light-emitting diodes positioned at said second end of said light guide lens on opposite sides of said longitudinal axis of symmetry.

2. The device as described in claim 1 wherein said light-emitting diodes are positioned above said mounting flanges and adjacent both said inclined sidewalls and said raised section, whereby light from the light emitting diodes must pass through and along said light guide lens to illuminate said text and images.

3. The device as described in claim 1 further comprising:
   a first undercut formed in a first end of said bottom housing adjacent a first edge of said camera aperture and a second undercut formed in a second end of said bottom housing adjacent a second edge of said camera aperture.

4. The device as described in claim 3 wherein said first undercut is adapted to receive said first mounting flange, said first undercut defined by a first overhang, and said second undercut adapted to receive said second mounting flange, said second undercut defined by a second overhang.

5. The device as described in claim 4 wherein said first mounting flange has a length in excess of a depth of said first undercut so that a first space is created between said raised section of said light guide lens and said first overhang, said first space being larger than the light-emitting diodes; and
   wherein said second mounting flange has a length in excess of a depth of said second undercut so that a second space is created between said raised section of said light guide lens and said second overhang.

6. The device as described in claim 1 wherein the bottom housing includes a low friction surface to permit the device to slide on top of the object being viewed.

7. The device of claim 1, further comprising:
   a stiffener disposed in overlying relation to an exterior side of said PCB, and a window formed in said stiffener, substantially centrally thereof, to allow light to pass therethrough and hence through said raised section of said light guide lens.

8. The device of claim 7 further comprising:
   a series of alignment apertures positioned about said window of said stiffener and wherein said upstanding pegs are positioned within said alignment apertures of said stiffener.

9. A generally flat, low profile device that enlarges text and images to enable a low vision person to see said text and images, comprising:
   a hollow structure including a top housing and a bottom housing that are connected to one another, said bottom housing including opposing overhangs and a series of alignment openings;
   a camera aperture formed in said bottom housing;
   said bottom housing adapted to contact an object to be viewed and to be supported by said object;
   said bottom housing adapted to be slidingly displaced during such contact with said object so that a user may move the device from one part of the object to another without lifting the device;
   a transparent light guide lens that includes an intermediate raised section, opposing flanges, and upstanding pegs, said flanges being mounted to said overhangs with said pegs positioned within said alignment openings, the light guide lens being disposed in closing relation to said camera aperture so that all light entering said camera aperture must first pass through said light guide lens;
   a cavity formed in an exterior surface of said light guide lens;
   said cavity defined at its periphery by a plurality of sidewalls that are inclined at an obtuse angle to reflect light at an optimal angle;
   a plurality of light-emitting diodes secured about said light guide lens, the light-emitting diodes being positioned adjacent both said raised section and said inclined sidewalls, whereby light from the light emitting diodes must pass through and along said light guide lens to illuminate said text and images;
   whereby said text and images are well-illuminated.

10. The device as described in claim 9 further comprising a printed circuit board disposed in overlying relation to an interior side of said light guide lens, the printed circuit board including a window in alignment with the light guide lens.

11. The device of claim 10 wherein said printed circuit board is black to provide a mask about said camera aperture and reduce stray light effects.

12. The device of claim 10 wherein said flanges are longer than said overhangs such that opposing cavities are formed between said bottom housing and said light guide lens.

13. A generally flat, low profile device that enlarges text and images to enable a low vision person to see said text and images, comprising:

a hollow structure including a top housing and a bottom housing that are connected to one another, said bottom housing including a camera aperture and opposing overhangs, a series of alignment openings formed about said camera aperture;

said bottom housing adapted to contact an object to be viewed and to be supported by said object;

said bottom housing adapted to be slidingly displaced during such contact with said object so that a user may move the device from one part of the object to another without lifting the device;

a transparent light guide lens that includes an intermediate raised section, opposing flanges, and upstanding pegs, said flanges being mounted to said overhangs with said pegs positioned within said alignment openings of said bottom housing, the light guide lens being disposed in closing relation to said camera aperture so that all light entering said camera aperture must first pass through said light guide lens;

a cavity formed in an exterior surface of said light guide lens;

said cavity defined at its periphery by a plurality of sidewalls that are inclined at an obtuse angle to reflect light at an optimal angle;

a printed circuit board having a window, a series of alignment apertures formed about said window, said printed circuit board being disposed in overlying relation to said light guide lens with said upstanding pegs being positioned within said alignment apertures of said printed circuit board;

a stiffener disposed in overlying relation to an exterior side of said printed circuit board, and a window formed in said stiffener, substantially centrally thereof, a series of alignment apertures formed about said window, said upstanding pegs being positioned within said alignment apertures of said stiffener.

* * * * *

UNITED STATES PATENT AND TRADEMARK OFFICE
CERTIFICATE OF CORRECTION

PATENT NO. : 8,469,534 B2
APPLICATION NO. : 13/041734
DATED : June 25, 2013
INVENTOR(S) : Mike Hanney, Peter Iezzi and Todd Conard Page 1 of 1

It is certified that error appears in the above-identified patent and that said Letters Patent is hereby corrected as shown below:

In the Specification

Col. 3, line 42, the term "fowled" should be "formed".

Signed and Sealed this
Thirteenth Day of August, 2013

Teresa Stanek Rea
*Acting Director of the United States Patent and Trademark Office*